(12) United States Patent
Rühle et al.

(10) Patent No.: US 9,242,546 B2
(45) Date of Patent: Jan. 26, 2016

(54) DRIVETRAIN FOR A MOTOR VEHICLE

(71) Applicant: GETRAG Getriebe- und Zahnradfabrik Hermann Hagenmeyer GmbH & Cie KG, Untergruppenbach (DE)

(72) Inventors: Günter Rühle, Löchgau (DE); Jochen Bausch, Bietigheim (DE); Mark Schweiher, Lauffen (DE); Jörg Meissner, Bretzfeld (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 14/087,878

(22) Filed: Nov. 22, 2013

(65) Prior Publication Data

US 2014/0080650 A1    Mar. 20, 2014

Related U.S. Application Data

(63) Continuation of application No. PCT/EP2012/057525, filed on Apr. 25, 2012.

(30) Foreign Application Priority Data

May 23, 2011    (DE) .......................... 10 2011 102 267

(51) Int. Cl.
*B60K 6/387*    (2007.10)
*B60K 6/547*    (2007.10)
(Continued)

(52) U.S. Cl.
CPC . *B60K 6/50* (2013.01); *B60K 6/442* (2013.01); *F16D 48/0206* (2013.01);
(Continued)

(58) Field of Classification Search
None
See application file for complete search history.

(56) References Cited

U.S. PATENT DOCUMENTS 4,470,476 A * 9/1984 Hunt .......................... 180/65.25
4,923,025 A * 5/1990 Ellers ......................... 180/65.23
(Continued)

FOREIGN PATENT DOCUMENTS

CN        1420034 A      5/2003
CN      201362167 Y     12/2009
(Continued)

OTHER PUBLICATIONS

Written Opinion & International Search Report for PCT/EP2012/057525 dated Jul. 10, 2012, 8 pages.
(Continued)

*Primary Examiner* — Ramya Burgess
*Assistant Examiner* — Lillian Nguyen
(74) *Attorney, Agent, or Firm* — Reising Ethington P.C.

(57) ABSTRACT

A drivetrain for a motor vehicle has a first electric machine provides drive power, wherein the first electric machine is connected to an electrical energy store. A differential can distribute drive power to two driven wheels or axles of the motor vehicle. A first transmission arrangement which connects the first electric machine to the differential. A second electric machine which is coupled to an internal combustion engine in order to charge the electrical energy store in a generator mode. A second transmission arrangement connects the internal combustion engine to the differential. The second transmission arrangement has a first gear stage and a second gear stage which can be alternately engaged, for the transmission of drive power from the internal combustion engine to the differential, by means of a clutch arrangement.

19 Claims, 2 Drawing Sheets

(51) Int. Cl.
*B60K 6/442* (2007.10)
*B60K 6/50* (2007.10)
*F16H 61/00* (2006.01)
*F16H 61/02* (2006.01)
*F16D 48/02* (2006.01)
*B60K 6/485* (2007.10)
*B60K 6/48* (2007.10)

(52) U.S. Cl.
CPC ....... *F16H 61/0025* (2013.01); *F16H 61/0267* (2013.01); *B60K 6/485* (2013.01); *B60K 2006/4808* (2013.01); *B60Y 2400/421* (2013.01); *B60Y 2400/4244* (2013.01); *F16D 2048/026* (2013.01); *F16D 2048/029* (2013.01); *F16D 2048/0248* (2013.01); *F16D 2500/3024* (2013.01); *Y02T 10/626* (2013.01); *Y02T 10/6226* (2013.01); *Y02T 10/6234* (2013.01); *Y10S 903/902* (2013.01)

(56) References Cited

U.S. PATENT DOCUMENTS

| | | | |
|---|---|---|---|
| 6,921,984 B2 | 7/2005 | Rogg | |
| 7,343,993 B2 | 3/2008 | Dong | |
| 8,740,745 B2 * | 6/2014 | Murayama | 477/8 |
| 2004/0147365 A1 | 7/2004 | Komeda et al. | |
| 2004/0204286 A1 | 10/2004 | Stridsberg | |
| 2010/0032218 A1 * | 2/2010 | Ideshio et al. | 180/65.225 |
| 2011/0098151 A1 | 4/2011 | Ziemer | |

FOREIGN PATENT DOCUMENTS

| | | |
|---|---|---|
| DE | 10340472 A1 | 6/2005 |
| DE | 102008002381 A1 | 12/2009 |
| DE | 102009018885 A1 | 10/2010 |
| DE | 102009024625 A1 | 12/2010 |
| EP | 1205330 A2 | 5/2002 |

OTHER PUBLICATIONS

German Search Report dated Jan. 5, 2012, 5 pages.
English translation of the International Preliminary Report on Patentability dated Dec. 5, 2013, 7 pages.
Chinese Office Action dated Sep. 1, 2015, 7 pages.
English/German Translation of Chinese Office Action dated Sep. 1, 2015, 10 pages.

* cited by examiner

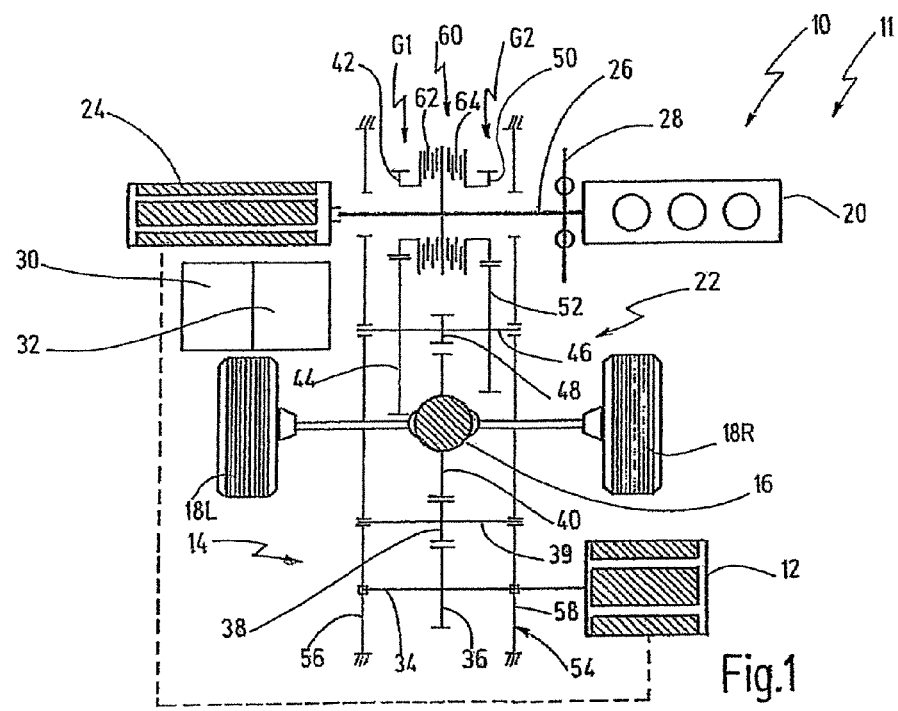
Fig.1
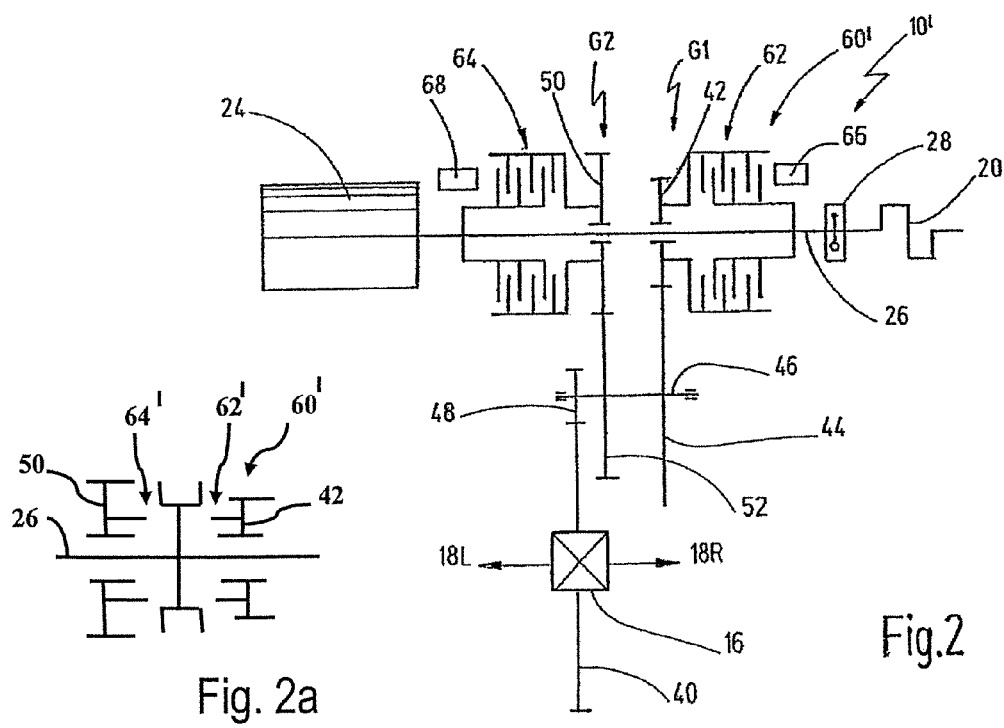
Fig. 2a
Fig.2

DRIVETRAIN FOR A MOTOR VEHICLE

CROSS REFERENCES TO RELATED APPLICATIONS

This application is a continuation of international patent application PCT/EP2012/057525, filed on Apr. 25, 2012, which claims priority from German patent application DE 10 2011 102 267.1, filed on May 23, 2011, the whole content of these applications is hereby included by reference.

BACKGROUND

The present invention relates to a drivetrain for a motor vehicle, which has a first electric machine for providing drive power which can be transmitted via a first transmission arrangement to a differential of a driven axle of the motor vehicle. Furthermore, the drivetrain has an internal combustion engine and a second electric machine which is coupled to the internal combustion engine in order to charge the electrical energy store in a generator mode. Furthermore, a second transmission arrangement is provided which is designed to connect the internal combustion engine to the differential.

A drivetrain of said type is known under the term "range extender". A drivetrain of said type is designed to supply drive power to the vehicle by means of the first electric machine. To increase the range of the motor vehicle, the internal combustion engine is provided; this can charge the electrical energy store by means of the second electric machine, if appropriate also while electrical power is being extracted from the energy store by means of the first electric machine. The range can hereby be extended considerably in relation to a purely electric vehicle.

Furthermore, in the case of a drivetrain of said type, it is generally provided that the motor vehicle can also be driven by means of the internal combustion engine.

The second transmission arrangement used for this purpose may have a conventional motor vehicle transmission with a multiplicity of gear stages. This however in turn increases the weight of the vehicle.

SUMMARY

It is therefore the object of the present invention to specify a drivetrain for a motor vehicle which is configured as a range extender drivetrain and which can be realized at low cost and with a low weight.

Said object is achieved by means of a drivetrain, as mentioned at the outset, wherein the second transmission arrangement has a first gear stage and a second gear stage which can be alternately engaged, for the transmission of drive power from the internal combustion engine to the differential, by means of a clutch arrangement.

The second transmission arrangement preferably has only the first gear stage and the second gear stage.

In the case of the drivetrain according to the invention, the internal combustion engine is preferably used only in a restricted speed range of the motor vehicle. The use of only two gear stages in the second transmission arrangement is thus generally adequate.

Accordingly, the second transmission arrangement of the drivetrain can be realized at low cost and with a low weight. The object is thereby achieved in its entirety.

In one advantageous embodiment, the clutch arrangement has a first clutch and a second clutch. In this way, it is possible for the first gear stage to be engaged and disengaged by means of the first clutch and for the second gear stage to be engaged and disengaged by means of the second clutch.

In one particularly preferred embodiment, the first and/or the second clutch has a positive-locking shift clutch.

Such positive-locking shift clutches may for example be combined to form a shift clutch pack which is arranged between two loose gears. Here, the shift clutch may be in the form of a synchronized shift clutch.

In this embodiment, the clutch arrangement can be produced at low cost because positive-locking shift clutches of said type are produced in high unit quantities for example for manual shift transmissions. Furthermore, the positive-locking configuration of the clutch makes a situation possible in which no energy is required to close the clutch during ongoing operation by means of the internal combustion engine.

Starting of the motor vehicle by means of a drivetrain of said type may for example be performed by way of a starting and separating clutch arranged between the internal combustion engine and the clutch arrangement, said starting and separating clutch being for example a dry clutch or a wet-running multiplate clutch. It is alternatively or additionally possible for starting to be performed by way of the first electric machine.

In one alternative embodiment, the clutch arrangement has a first clutch and a second clutch, at least one of which is in the form of a powershift clutch.

In said embodiment, the at least one powershift clutch can be used not only for engaging the associated gear stage. In fact, by contrast to a synchronizing clutch, the powershift clutch can also be used for starting, for example. In the latter case, it is for example possible for the vehicle to be operated purely under internal combustion engine power in the event of failure of the electric machine, even though in this case it may be necessary for a high rotational speed difference to be overcome in the powershift clutch during a starting process.

A further advantage of said embodiment is that there is no need for a starting and/or separating clutch which is separate from the gear stage clutches.

In a further embodiment, it is possible to implement one of the two clutches as a powershift clutch and the other clutch as a positive-locking shift clutch.

In the present case, the expression "powershift clutch" refers generally to a friction clutch that can transmit drive power even in a slipping state. The expression "powershift clutch" is not intended to signify that shifts between the gear stages can take place under load. However, if a powershift clutch is used for each of the two gear stages, gear stage changes are generally also possible under load, in particular also without an interruption in traction force.

It is particularly advantageous here if the powershift clutch is in the form of a wet-running multiplate clutch.

Such wet-running multiplate clutches are firstly of compact construction and secondly can also be configured for transmitting high levels of drive power.

Overall, it is also preferable if the clutch arrangement, or the first and the second clutch, is arranged coaxially with respect to a connecting shaft by means of which the second electric machine and the internal combustion engine are coupled to one another.

Said embodiment permits a compact connection of the connecting shaft to the second transmission arrangement.

In a further preferred embodiment, it is provided that the second electric machine is connected rotationally conjointly to an output shaft of the internal combustion engine.

The connection may be realized for example by means of a connecting shaft. Here, the connection may if appropriate be realized via a vibration damper which allows the output shaft of the internal combustion engine and the second electric machine to rotate relative to one another to a limited extent and which is designed to dampen rotary vibrations generated by the internal combustion engine.

If at least one of the two clutches for the two gear stages is configured as a shift clutch, the connecting shaft may in this case be in the form of a solid shaft. In particular, when using a powershift clutch, it is not necessary for the output shaft of the internal combustion engine and the output shaft of the second electric machine to be connected to one another by means of a separate separating clutch. Further installation space can be saved in this way.

Furthermore, in a further, altogether preferable embodiment, it is provided that the second transmission arrangement has a first loose gear, which is assigned to the first gear stage, and a second loose gear, which is assigned to the second gear stage, wherein the first and the second loose gear are arranged coaxially with respect to a connecting shaft by means of which the second electric machine and the internal combustion engine are coupled to one another. In particular if the first and the second clutch for the two gear stages are also arranged coaxially with respect to the connecting shaft, drive power can possibly be transmitted in a simple manner from the connecting shaft to the differential via one of the two gear stages of the second transmission arrangement.

Here, it is particularly preferable for the first and the second loose gear to be rotatably mounted directly on the connecting shaft.

In this way, further installation space can be saved in the radial direction too. Cumbersome hollow-shaft constructions, which would have to be provided in the case of a separating clutch being provided in the region of the connecting shaft, can be omitted in this way.

It is also generally preferable if the clutch arrangement has a first and a second clutch, said clutches being arranged coaxially with respect to the connecting shaft, wherein the first and the second loose gear are arranged in an axial direction between the first and the second clutch.

In this way, an actuator arrangement for the actuation of the first and second clutches can be integrated in a relatively simple manner into the second transmission arrangement.

It is however alternatively also possible for the first and the second clutch to be arranged between the first and the second loose gear.

A further preferred embodiment provides that the first loose gear meshes with a first fixed gear, wherein the second loose gear meshes with a second fixed gear, wherein the first and the second fixed gear are fixed to an intermediate shaft, and wherein the intermediate shaft has fixed thereto a drive gearwheel which meshes with an input element (for example a gearwheel) of the differential.

In this way, drive power can be transmitted to the differential alternately via the first or the second gear stage. Furthermore, it is made possible for suitable transmission ratios to be set for the first and the second gear stage.

It is particularly preferable here if the second drive gearwheel is, in an axial direction, arranged on one side of the first and of the second fixed gear.

Said embodiment is preferable in particular when the two fixed gears of the first and of the second gear stage are arranged directly adjacent to one another in an axial direction.

In an embodiment in which the two clutches are arranged between the loose gears, the drive gearwheel may also be arranged between the first and the second fixed gear.

Overall, it is also preferable if the transmission ratios of the first and of the second gear stage are selected such that driving of the vehicle by means of the internal combustion engine within intended parameters is only possible at vehicle speeds greater than 30 km/h.

Here, "driving within intended parameters" is to be understood here to mean that the clutch that is respectively transmitting power is completely or almost completely closed, that is to say in the case of a powershift clutch is substantially not slipping (microslip).

In this way, it is provided that driving under internal combustion engine power is generally possible only at relatively high vehicle speeds. Two gear stages are adequate for this.

It is particularly preferable for the speed threshold to be higher than 50 km/h, in particular higher than 80 km/h.

In a further preferred embodiment, the clutch arrangement is hydraulically actuated and/or cooled.

In particular if the clutches of the clutch arrangement are wet-running multiplate clutches, it is preferable for said clutches to be cooled and/or lubricated by means of a hydraulic fluid. In this case, it is particularly preferable for the actuation of the clutches to also be realized hydraulically, because a hydraulic circuit is provided in any case.

During shifting of the gear stages, the internal combustion engine can be accelerated or decelerated to a target rotational speed level with assistance from the generator. In this way, the shift work in the respective clutch can be reduced. Furthermore, during a shift, the vehicle can also continue to be driven by the first electric machine, such that an interruption in traction force can likewise be avoided.

Provided that the clutches are in the form of powershift-capable multiplate clutches, said clutches can also be operated with microslip in critical rotational speed ranges. By means of this measure, it is possible for the weight and the mass moment of inertia of a torsional or vibration damper in the region of a connecting shaft between the internal combustion engine and the second electric machine to be reduced, without acoustic disadvantages being encountered.

Overall, the drivetrain can be constructed with a small number of components. Furthermore, the drivetrain can be realized with a low weight, within a small installation space, and at low cost.

It is self-evident that the features mentioned above and the features yet to be explained below can be used not only in the respectively specified combination but also in other combinations or individually without departing from the scope of the present invention.

BRIEF DESCRIPTION OF THE DRAWINGS

Exemplary embodiments of the invention are illustrated in the drawings and will be explained in more detail in the following description. In the drawings:

FIG. 1 is a schematic illustration of a motor vehicle having a first embodiment of a drivetrain according to the invention;

FIG. 2 is a schematic illustration of a part of a further embodiment of a drivetrain; and FIG. 2A is a detail view of the drivetrain of FIG. 2 with an alternative clutch arrangement.

DESCRIPTION OF PREFERRED EMBODIMENTS

Figure 3:
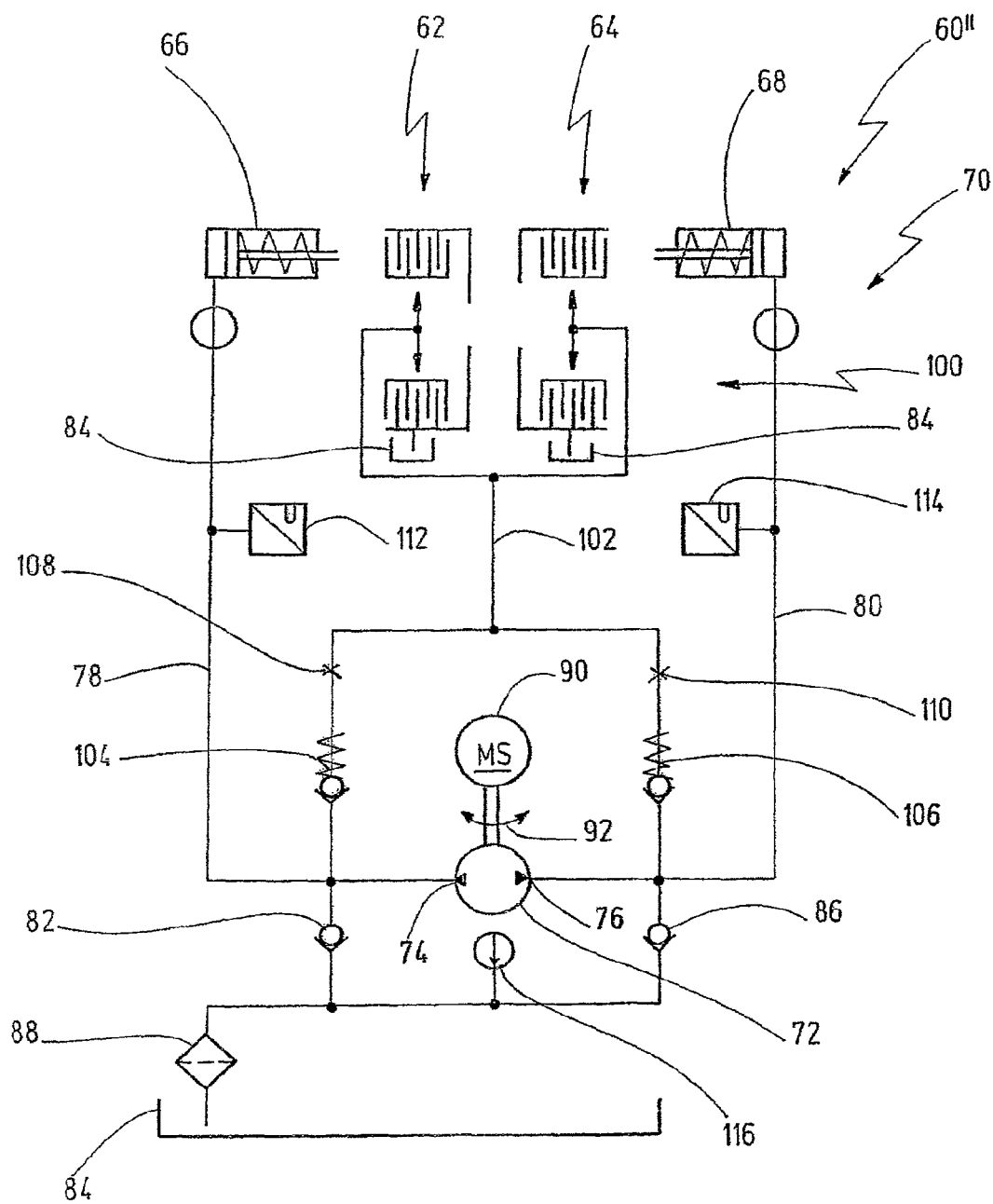
FIG. 3 shows a clutch arrangement for a drivetrain according to the invention.

FIG. 1 schematically illustrates a drivetrain of a motor vehicle 11, said drivetrain being indicated by 10.

The drivetrain 10 has a first electric machine 12 which is designed to provide drive power for the motor vehicle 11.

Furthermore, the drivetrain 10 has a differential 16 which is designed to distribute drive power to two driven wheels 18L, 18R (or to two axles) of the motor vehicle 11. Drive power from the first electric machine 12 is transmitted to the differential 16 via a first transmission arrangement 14.

Furthermore, the drivetrain 10 comprises an internal combustion engine 20. Drive power generated by the internal combustion engine 20 can be transmitted to the differential 16 via a second transmission arrangement 22. The drivetrain 10 also comprises a second electric machine 24, which is operated in particular as a generator and which is connected rotationally conjointly to an outer shaft (crankshaft) of the internal combustion engine 20 via a connecting shaft 26. Here, a vibration or torsional damper 28 may be provided on the connecting shaft 26 in order to dampen rotational vibrations of the internal combustion engine 20.

The first electric machine 12 and the second electric machine 24 are connected to a power control unit 30, which in turn is connected to an electrical energy store 32 (vehicle battery).

The drivetrain 10 is configured as a range extender drivetrain. The vehicle can for example be driven purely electromotively by means of the first electric machine 12. If the level of charge of the electrical energy store 32 falls below a certain threshold level, the internal combustion engine 20 can be started in order thereby to drive the second electric machine 24 as a generator, by means of which the electrical energy store 32 is recharged.

Furthermore, driving purely under internal combustion engine power is possible by means of the second transmission arrangement 22, but preferably only in speed ranges above 30 km/h, preferably above 50 km/h and particularly preferably above 80 km/h.

The first transmission arrangement 14 has a first drive shaft 34 which is coupled to an output shaft of the first electric machine 12. Fixed to the first drive shaft is a gearwheel 36 which meshes with a first drive gearwheel (first drive pinion) 38. The first drive gearwheel 38 is fixed to a first intermediate shaft 39 which is oriented parallel to the first drive shaft 34. The first drive gearwheel 38 meshes with an input element (for example a gearwheel) of the differential 16.

The first drive shaft 34 and the first intermediate shaft 39 are oriented transversely with respect to a longitudinal axis of the motor vehicle 11, in particular approximately parallel to the driven axle of the wheels 18L, 18R.

The second transmission arrangement 22 has a first gear stage G1 and a second gear stage G2. The internal combustion engine 20 can consequently be connected to the differential 16 via the different transmission ratios of the first and of the second gear stage G1, G2.

The first gear stage G1 comprises a first loose gear 42 which is rotatably mounted on the connecting shaft 26. The first loose gear 42 meshes with a first fixed gear 44 which is fixed to a second intermediate shaft 46. To the second intermediate shaft 46 there is also fixed a second drive gearwheel 48 (second drive pinion) which meshes with the input element 40 of the differential 16.

The second gear stage G2 has a second loose gear 50, which is rotatably mounted on the connecting shaft 26, and a second fixed gear 52, which is rotationally conjointly connected to the second intermediate shaft 46.

The second drive gearwheel 48 is arranged between the first fixed gear 44 and the second fixed gear 52 in an axial direction of the second intermediate shaft 46.

The second intermediate shaft 46 and the connecting shaft 26 are likewise oriented transversely with respect to a longitudinal axis of the motor vehicle 11, in particular parallel to the first drive shaft 34 and to the first intermediate shaft 39.

The drivetrain 10 also has a housing 54 which has a first housing wall 56, which extends substantially parallel to the longitudinal axis of the motor vehicle 11, and a second housing wall 58, which extends substantially parallel to the longitudinal axis of the motor vehicle. The first drive shaft 34, the first intermediate shaft 39 and the second intermediate shaft 46, and if appropriate the connecting shaft 26, are mounted rotatably relative to the housing 54, preferably by means of respective radial bearings on the first housing wall 56 and on the second housing wall 58.

For the shifting of the two gear stages G1, G2, a clutch arrangement 60 is provided. The clutch arrangement 60 has a first clutch 62 and a second clutch 64. The first and the second clutch 62, 64 are arranged between the first loose gear 42 and the second loose gear 50 in an axial direction of the connecting shaft 26. The first and the second clutch 62, 64 are in each case in the form of powershift clutches, in particular in the form of wet-running multiplate clutches. The first clutch 62 and the second clutch 64 have a common input element which is rotationally conjointly connected to the connecting shaft 26. An output element of the first clutch 62 is connected to the first loose gear 42. An output element of the second clutch 64 is connected to the second loose gear 50.

The first and the second clutch 62, 64 can, with a suitable actuator arrangement, be actuated in overlapping fashion during a gear change in order to avoid interruptions in traction force. The two clutches 62, 64 are however preferably actuated by means of an actuator arrangement which permits a changeover from one gear stage to another gear stage only with an interruption in traction force, as will be described below. Such an actuator arrangement is preferably in the form of a hydraulic actuator arrangement, especially since, in the case of wet-running multiplate clutches, it is generally also necessary for these to be lubricated and cooled by means of a fluid.

Alternatively, the clutch arrangement may also be implemented with two clutches in the form of positive-locking shift clutches which are, for example, hydraulically or electrically actuated. Interruptions in traction force may possibly be avoided here by the first electric machine providing traction force during gear changes.

The transmission ratios realized by means of the first and the second gear stage G1, G2 make it possible, during operation within intended parameters, for the motor vehicle 11 to be driven at speeds above the abovementioned speed thresholds (for example greater than 30 km/h). Provided that at least one of the two clutches 62, 64 is in the form of a powershift clutch, however, starting by means of the internal combustion engine 20 is also possible in an emergency operating situation.

FIG. 2 shows a part of an alternative embodiment of a drivetrain 10'. The drivetrain 10' generally corresponds, with regard to construction and mode of operation, to the drivetrain 10 of FIG. 1. Identical elements are thus denoted by the same reference numerals. Substantially the differences will be explained below.

In the case of the drivetrain 10', the first and the second loose gear 42, 50 are arranged adjacent to one another. The clutch arrangement 60' has a first clutch 62 for the first gear stage G1, said first clutch being arranged between the first loose gear 42 and the internal combustion engine 20 as viewed in an axial direction. The second clutch 64 is arranged between the second loose gear 50 and the second electric machine 24 as viewed in an axial direction.

The first clutch 62 is actuated by means of a schematically indicated first hydraulic cylinder 66, and the second clutch 64 is actuated by means of a schematically indicated second hydraulic cylinder 68. The actuating directions of the hydraulic cylinders 66, 68 point toward one another.

The second drive gearwheel 48 is arranged adjacent to the two fixed gears 44, 52 as viewed in an axial direction and meshes with the input element 40 of the differential 16. The construction of the drivetrain 10' corresponds to that of the drivetrain 10 of FIG. 1 as regards the first electric machine 12 and the first transmission arrangement 14.

In the drivetrain 10', the first and the second clutch 62, 64 each have a dedicated input element which is connected rotationally conjointly to the connecting shaft 26. Owing to the hydraulic cylinders 66, 68 that act in an axially outward direction, however, the installation space required for this purpose can be more easily integrated into the existing overall installation space.

FIG. 2A shows an alternative embodiment of a clutch arrangement 60' in which the first clutch 62' and the second clutch 64' are designed as positive-locking shift clutches which are preferably combined in a shift clutch pack between the loose gears 42, 50.

FIG. 3 shows, in schematic form, an embodiment of a clutch arrangement 60'' which can be used in the drivetrains 10, 10' of FIGS. 1 and 2.

The clutch arrangement 60'' of FIG. 3 has an actuator arrangement 70 with a single actuator pump 72. The actuator pump 72 has a first port 74 and a second port 76. The first port 74 is connected via a first connecting line 78 directly to a first hydraulic cylinder 66 for the actuation of the first clutch 62. The second port 76 is connected via a second connecting line 80 directly to a second hydraulic cylinder 68 for the actuation of the second clutch 64.

The first port 74 is furthermore connected via a first check valve 82 (first poppet valve) to a tank 84. The second port 76 is connected via a second check valve 86 (second poppet valve) to the tank 84. The connection may in this case include a fluid filter 88 which is arranged between the check valves 82, 86 and the tank 84.

The actuator pump 72 is driven by means of an electric motor 90, which is in the form of a dedicated actuator motor and which can be operated independently of the first and the second electric machine 12, 24.

The electric motor 90 is designed to drive the actuator pump 72 in two directions of rotation, as shown in FIG. 3 at 92.

In the first direction of rotation, the first port 74 is a pressure port and the second port 76 is a suction port which draws fluid out of the tank 84 via the second check valve 86. In the second direction of rotation, the first port 74 is a suction port which draws fluid out of the tank 84 via the first check valve 82, and the second port 76 is a pressure port. In the first direction of rotation, the first check valve 82 prevents fluid from flowing back into the tank 84. In the second direction of rotation, the second check valve 86 prevents fluid from flowing back into the tank 84.

The actuator arrangement 70 is in the form of a type of bidirectional pump actuator. The control of the travel and/or of the pressure of the two hydraulic cylinders 66, 68 may in this case be regulated and/or controlled by means of the rotational speed of the electric motor 90 and thus by means of the volume flow provided in each case by the actuator pump 72. To improve controllability and/or regulability, provision may be made for the first and/or the second connecting line 78, 80 to be connected to the tank 84 via an aperture.

In the present case, the actuator arrangement 70 however also serves to supply a lubricating fluid to the first and the second clutch 62, 64. For this purpose, the actuator arrangement 70 has a lubrication circuit 100 which comprises a lubricating fluid line 102. The lubricating fluid line 102 is connected via suitable lines to the first and the second clutch 62, 64, in particular to radially inner sections of the two clutches 62, 64 in order to supply these with lubricating fluid radially from the inside. The lubricating fluid is subsequently supplied back to the tank, as is schematically shown at 84, below the two clutches 62, 64.

The lubricating fluid line 102 is connected to the first port 74 via a third check valve 104. Furthermore, the lubricating fluid line 102 is connected via a fourth check valve 106 to the second port 76 of the actuator pump 72. The third and the fourth check valve 104, 106 may preferably be spring-loaded check valves, as schematically indicated in FIG. 3.

Furthermore, a first aperture 108 is provided between the third check valve 104 and the lubricating fluid line 102. A second aperture 110 is provided between the fourth check valve 106 and the lubricating fluid line 102.

In the first direction of rotation, in which the first port 74 is a pressure port, fluid is consequently supplied to the lubricating fluid line 102 via the third check valve 104 and the first aperture 108. Here, the first aperture 108 serves as a leakage aperture and improves the controllability and regulability of the pressure in the first connecting line 78. In the first direction of rotation, fluid is drawn in via the second port 76, such that the fourth check valve 106 is closed.

In the second direction of rotation, the second port 76 is a pressure port, such that fluid is supplied to the lubricating fluid line 102 via the fourth check valve 106 and the second aperture 110. Here, too, the second aperture 110 serves to improve the regulability. In the second direction of rotation, the first port 74 is a suction port, such that the third check valve 104 is closed.

Provision is optionally made for a first pressure sensor 112 to be provided on the first connecting line 78 in order to measure, and if appropriate be able to regulate, the fluid pressure in the first connecting line 78. A second pressure sensor 114 may correspondingly also be provided on the second connecting line 80.

Finally, a temperature sensor 116 may be provided in the region of a line which connects the check valves 82, 86 to the tank 84, which temperature sensor likewise preferably serves for the adaptation of control or regulation characteristic curves of a control device (not illustrated in any more detail) as a function of the temperature of the fluid.

The first and the second clutch 62, 64 are preferably designed as "normally open" clutches. The first and the second hydraulic cylinder 66, 68 may in this case be in the form of single-acting hydraulic cylinders which are optionally equipped with a mechanical restoring spring, as shown in FIG. 3.

Since, in this embodiment of the actuator arrangement 70, only either the first or the second hydraulic cylinder 66, 68 is supplied with pressure, it is not possible in this embodiment for gear changes to be performed under load. This is however generally not required in the case of this type of drivetrain.

By means of the illustrated actuator arrangement 70, it is possible for the hydraulic system to be ventilated during the filling of the first or of the second connecting line 78, 80. Furthermore, air is prevented from being pumped into the hydraulic system by means of the actuator pump 72. The apertures provided for improving regulability are in this case not directly connected to the connecting lines 78, 80 but rather are integrated into the lubrication circuit 100. The intentional leakage through the leakage aperture is consequently not supplied directly to the tank 84, but rather is supplied to the two clutches 62, 64 for lubrication purposes. In this way, an additional lubricating fluid pump can be omitted. The check valves 104, 106 make it possible for lubricating oil to be supplied to the clutches 62, 64 regardless of the direction of rotation of the actuator pump 72, without the risk of air being drawn in by the actuator pump 72. To ensure the functioning thereof, the third and the fourth check valve 104, 106 are in each case preferably equipped with a preload spring, as mentioned above.

The actuator arrangement 70 can be realized with few components. Here, the gear stages G1, G2 can be shifted without the need for mechanical shift components such as for example shift drums, shift rods or the like. The actuator pump 72 with the electric motor 90 coupled thereto can be arranged within the drivetrain 10 at a location which is expedient from an installation space aspect. Overall, considerable installation space and weight advantages are attained in relation to a conventional shift actuator arrangement.

Instead of a single lubricating fluid line 102, it is also possible for two lubricating fluid lines to be provided, one of which connects the first aperture 108 to the first clutch 62, and the second line of which connects the second aperture 110 to the second clutch 64. In this way, it is if appropriate possible for the relatively small volume flow to be better utilized, because in this case the clutch that is presently being actuated is supplied with lubricating oil.

The invention claimed is:

1. A drivetrain for a motor vehicle, having:
    a first electric machine for providing drive power, wherein the first electric machine is connected to an electrical energy store;
    a differential which can distribute drive power to two driven wheels or axles of the motor vehicle;
    a first transmission arrangement which connects the first electric machine to the differential;
    an internal combustion engine;
    a second electric machine which is coupled to the internal combustion engine in order to charge the electrical energy store in a generator mode;
    a connecting shaft which couples the internal combustion engine with the second electric machine, wherein the internal combustion engine and the second electric machine are arranged coaxially with respect to the connecting shaft; and
    a second transmission arrangement which connects the internal combustion engine to the differential;
    wherein the second transmission arrangement has a first gear stage and a second gear stage which can be alternately engaged, for the transmission of drive power from the internal combustion engine to the differential, by means of a clutch arrangement;
    wherein the second transmission arrangement has a first loose gear, which is assigned to the first gear stage, and a second loose gear, which is assigned to the second gear stage, wherein the first and the second loose gears are arranged coaxially with respect to the connecting shaft by means of which the second electric machine and the internal combustion engine are coupled to one another so that the first and the second loose gears are arranged between the second electric machine and the internal combustion engine, as seen in an axial direction of the connecting shaft; and
    wherein the first and the second loose gears are rotatably mounted directly on the connecting shaft.

2. The drivetrain according to claim 1, wherein the clutch arrangement has a first clutch and a second clutch.

3. The drivetrain according to claim 2, wherein at least one of the first and the second clutch has a positive-locking shift clutch.

4. The drivetrain according to claim 1, wherein the clutch arrangement is arranged coaxially with respect to the connecting shaft by means of which the second electric machine and the internal combustion engine are coupled to one another.

5. The drivetrain according to claim 1, wherein the second electric machine is connected rotationally conjointly to an output shaft of the internal combustion engine.

6. The drivetrain according to claim 1, wherein the clutch arrangement has a first and a second clutch, said clutches being arranged coaxially with respect to the connecting shaft, and wherein the first and the second loose gears are arranged in an axial direction between the first and the second clutches.

7. The drivetrain according to claim 1, wherein the first loose gear meshes with a first fixed gear, wherein the second loose gear meshes with a second fixed gear, wherein the first and the second fixed gears are fixed to an intermediate shaft, and wherein the intermediate shaft has fixed thereto a drive gearwheel which meshes with an input element of the differential.

8. The drivetrain according to claim 7, wherein the drive gearwheel is, in an axial direction, arranged on one side of the first and of the second fixed gears.

9. The drivetrain according to claim 1, wherein transmission ratios of the first and the second gear stages are selected such that driving of the vehicle by means of the internal combustion engine within intended parameters is only possible at vehicle speeds greater than 30 km/h.

10. A drivetrain for a motor vehicle, having:
    a first electric machine for providing drive power, wherein the first electric machine is connected to an electrical energy store;
    a differential which can distribute drive power to two driven wheels or axles of the motor vehicle;
    a first transmission arrangement which connects the first electric machine to the differential;
    an internal combustion engine;
    a second electric machine which is coupled to the internal combustion engine in order to charge the electrical energy store in a generator mode; and
    a second transmission arrangement which connects the internal combustion engine to the differential;
    wherein the second transmission arrangement has a first gear stage and a second gear stage which can be alternately engaged, for the transmission of drive power from the internal combustion engine to the differential, by means of a clutch arrangement, and transmission ratios of the first and the second gear stages are selected such that driving of the vehicle by means of the internal combustion engine within intended parameters is only possible at vehicle speeds greater than 30 km/h; and
    wherein the clutch arrangement has a first clutch and a second clutch, and at least one of the first clutch and the second clutch is in the form of a power shift clutch which can be used for starting the vehicle by means of the internal combustion engine in the event of a failure of the first electric machine.

11. The drivetrain according to claim 10, wherein at least one of the first and/or the second clutches has a positive-locking shift clutch.

12. The drivetrain according to claim 10, wherein the clutch arrangement is arranged coaxially with respect to a connecting shaft by means of which the second electric machine and the internal combustion engine are coupled to one another.

13. The drivetrain according to claim 10, wherein the second electric machine is connected rotationally conjointly to an output shaft of the internal combustion engine.

14. The drivetrain according to claim 10, wherein the second transmission arrangement has a first loose gear, which is assigned to the first gear stage, and a second loose gear, which is assigned to the second gear stage, wherein the first and the second loose gears are arranged coaxially with respect to a connecting shaft by means of which the second electric machine and the internal combustion engine are coupled to one another.

15. The drivetrain according to claim 14, wherein the clutch arrangement has the first and the second clutch, said clutches being arranged coaxially with respect to the connecting shaft, and wherein the first and the second loose gears are arranged in an axial direction between the first and the second clutches.

16. The drivetrain according to claim 14, wherein the first loose gear meshes with a first fixed gear, wherein the second loose gear meshes with a second fixed gear, wherein the first and the second fixed gears are fixed to an intermediate shaft, and wherein the intermediate shaft has fixed thereto a drive gearwheel which meshes with an input element of the differential.

17. The drivetrain according to claim 16, wherein the second drive gearwheel is, in an axial direction, arranged on one side of the first and of the second fixed gears.

18. The drivetrain according to claim 10, wherein the clutch arrangement is hydraulically actuated and/or cooled.

19. A drivetrain for a motor vehicle, having:
a first electric machine for providing drive power, wherein the first electric machine is connected to an electrical energy store;
a differential which can distribute drive power to two driven wheels or axles of the motor vehicle;
a first transmission arrangement which connects the first electric machine to the differential;
an internal combustion engine;
a second electric machine which is coupled to the internal combustion engine in order to charge the electrical energy store in a generator mode; and
a second transmission arrangement which connects the internal combustion engine to the differential and comprises a clutch arrangement;
a starting and separating clutch which is arranged between the internal combustion engine and the clutch arrangement;
wherein the second transmission arrangement has a first gear stage and a second gear stage which can be alternately engaged, for the transmission of drive power from the internal combustion engine to the differential, by means of the clutch arrangement, and transmission ratios of the first and the second gear stages are selected such that driving of the vehicle by means of the internal combustion engine within intended parameters is only possible at vehicle speeds greater than 30 km/h;
wherein the clutch arrangement has a first positive locking shift clutch and a second positive locking shift clutch; and
wherein the starting and separating clutch can be used for starting the vehicle by means of the internal combustion engine in the event of a failure of the first electric machine.

* * * * *